May 23, 1933.  J. A. JOHNSTON  1,910,291
TRAP NEST
Filed Jan. 4, 1932  2 Sheets-Sheet 1
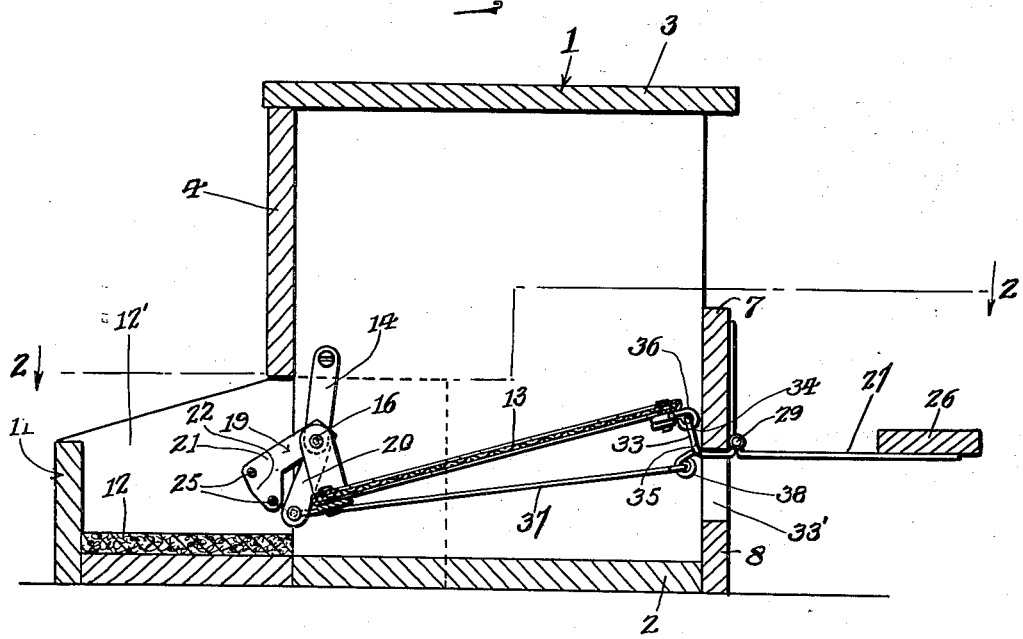
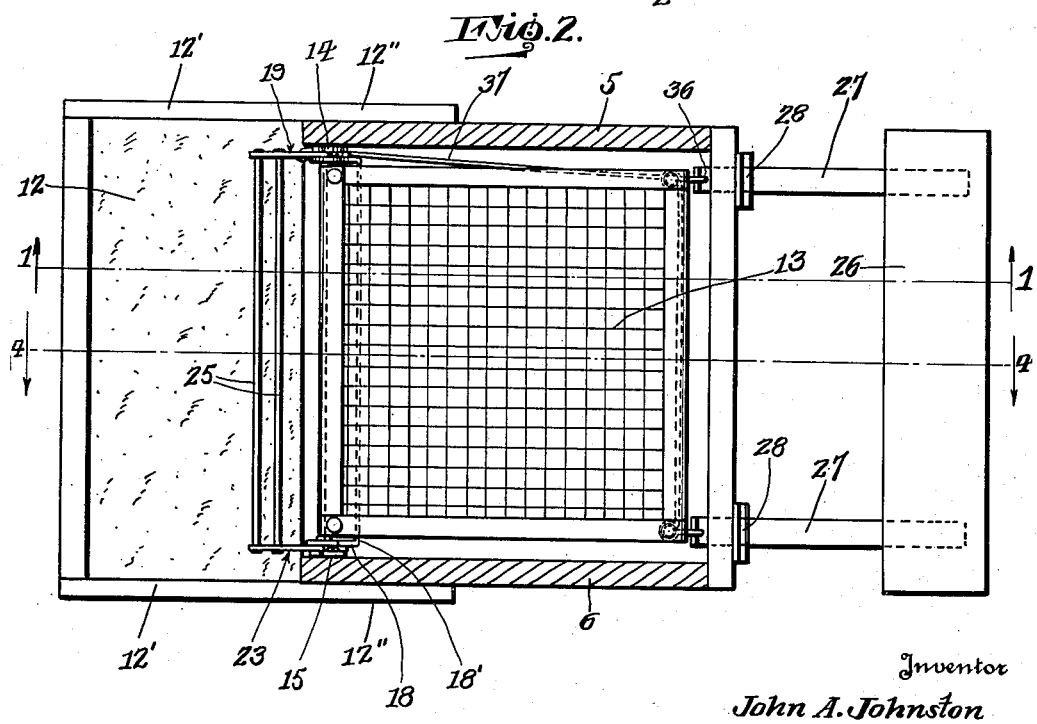
Inventor
John A. Johnston
By Geo. P. Kimmel
Attorney May 23, 1933.   J. A. JOHNSTON   1,910,291
TRAP NEST
Filed Jan. 4, 1932   2 Sheets-Sheet 2
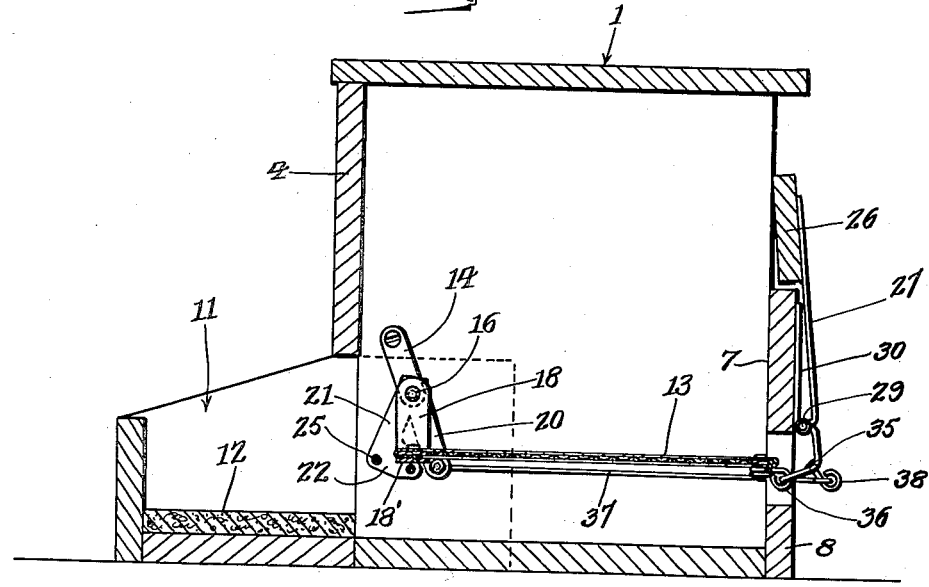
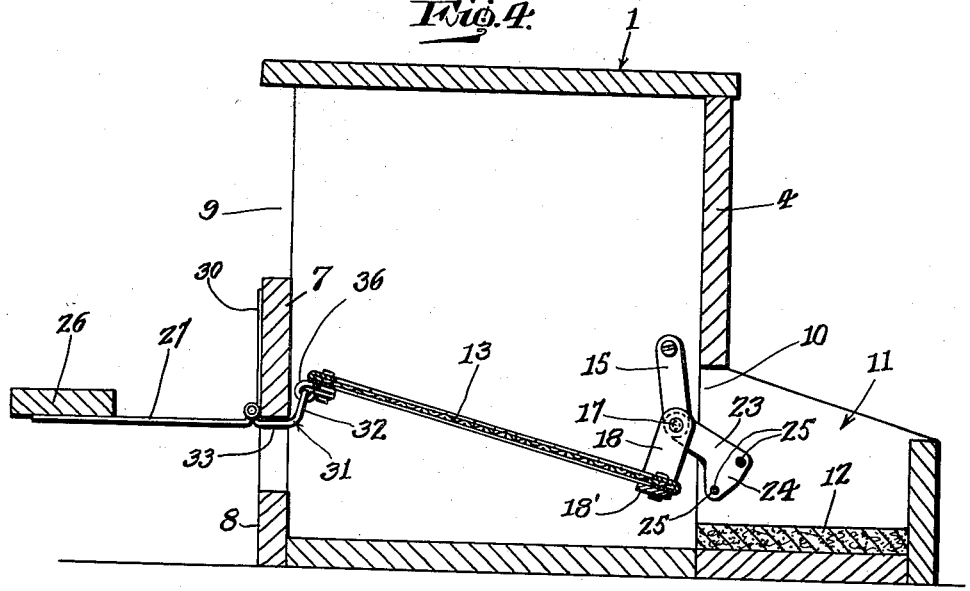
Inventor
John A. Johnston
By Geo. P. Kimmel
Attorney Patented May 23, 1933

1,910,291

UNITED STATES PATENT OFFICE

JOHN A. JOHNSTON, OF PROVO, UTAH, ASSIGNOR TO UTAH POULTRY PRODUCERS COOPERATIVE ASSOCIATION, OF SALT LAKE CITY, UTAH, A CORPORATION

TRAP NEST

Application filed January 4, 1932. Serial No. 584,721.

My invention relates to a trap nest.

The essential objects of my invention are to provide, a trap nest capable of being closed by the entrance of a laying hen for the purpose of trapping the hen therein and when closed preventing other hens entering the nest and interfering with the occupant thereof; to cause the egg to roll to the rear of the nest bottom when the hen that has laid the egg steps out of the nest; to provide for the egg to pass into a receiving trough as a hen enters the nest to lay; prevent access of the hen within the nest to the receiving trough; and to attain these ends in a comparatively simple, strong, compact, durable, thoroughly efficient and comparatively inexpensive structure.

To the above ends essentially and others which may hereinafter appear, my invention consists of a construction of trap nest which falls within the scope of the invention as claimed.

In the drawings:

Figure 1 is a section of the trap on line 1—1 Figure 2 looking in the direction of the arrows applied to said line.

Figure 2 is a sectional plan of the trap.

Figure 3 is a vertical longitudinal sectional view centrally of the trap when the latter is closed.

Figure 4 is a section on line 4—4 Figure 2 looking in the direction of the arrows applied to said line.

The nest includes a housing, generally indicated at 1 and comprising a bottom 2, a top 3, a rear wall 4, a pair of side walls 5, 6 and a front wall formed of a pair of superposed, parallel spaced sections 7, 8 the former being secured against the front edges of side walls 5, 6 and the front edge of bottom 2. The section 8 is arranged above section 7, is spaced from the latter and secured to the side walls 5, 6 the desired distance below the top 3 to provide an entrance and exit opening 9 for housing 1 at the front of the latter. The back wall 4 is of less height than the side walls 5, 6 and has its lower end spaced above bottom 1 to provide an egg discharge passage 10 for the passage of a laid egg from the housing 1 into a receiving trough 11. The latter extends rearwardly from the passage 10. The back wall 4 abuts the top 3. The trough 11 has a pad of cushioning material 12 upon which the egg is deposited from off of the bottom of the nest. The trough can be connected with the housing in any suitable manner and is shown by way of example as detachably connected by having the ends 12′ thereof extended forwardly, as at 12″ and frictionally engaging the side walls 5, 6. It is to be understood that trough 12 can be constructed in any preferred manner.

The housing 1 in connection with a reticulated member 13 arranged therein provides a nest. The bottom of the nest is provided by the member 13, the latter being suspended within housing 1 adjacent the bottom 2 of the latter. The member 13 normally inclines upwardly from rear to front and is shifted to a position parallel to bottom 2 when the hen enters the nest through opening 9.

The trap nest includes a combined egg guard and trapping mechanism which is operated by the hen. The said mechanism comprises a pair of opposed pivoted hangers 14, 15 secured to the inner face of the side walls 5, 6 in proximity to but above the top of passage 10. Extended inwardly from the lower end of hangers 14, 15 are pivots 16, 17 respectively upon which the arms 18 of a U-shaped carrier 18′ are suspended. The base of the carrier 18′ is secured to the lower face of member 13 at its rear. The carrier 18′ provides means for pivotally suspending the rear end of member 13. Depending from the pivot 16, at a point between a side of carrier 18′ and hanger 14 is an inverted V-shaped link element 19 consisting of a pair of oppositely inclined arms 20, 21, the latter being of less length than and having an enlarged lower end 22 extending towards the arm 20. The element 19 is loosely mounted at its top upon pivot 16. Depending from and loosely mounted at its top upon pivot 17 is a link 23 having a forwardly extending enlarged lower end 24 aligning with the enlarged lower end 22 of arm 21. The enlarged ends 22, 24 are connected together by spaced rods 25 which in connection with arm 21 and link 23 provide an egg guard to retard the eggs shifting from the member 13 into the trough, as well as preventing the hen from entering the trough.

The mechanism also includes a tread or step board 26 for the hen to facilitate her entrance into the nest. The tread board 26 also functions to close the opening 9 when the hen is nesting. The board 26 can be shifted downwardly by the hen for the purpose of opening the nest to enable the hen to pass from the housing. The board 26 is carried by a pair of spaced pivoted supports 27, each of which, at a point between its transverse median and inner end, is looped as at 28 for the purpose of mounting on a pivot 29 carried by the loop end of a vertical hinge member 30 which is fixed to the front face of section 8. That portion 31 of each support 27, which is arranged to extend rearwardly from a pivot 29 is of angle shape and the parts of such portion are designated 32, 33. The portion 31 of each support 27 extends rearwardly through the opening 33' formed between the sections 7, 8 of the front wall. The part 33 of each portion 31 is apertured at its free end, as at 34. One of said portions 31 is formed with an opening 35 at the point of joinder of the arms thereof. Fixed to the front of member 13 is a pair of spaced opposed forwardly extending coupling members 36 which are loosely connected to the arms 33 of the portions 31 by the openings 34. Attached to the lower end of arm 21 is the rear end of a coupling bar 37 which has its forward end loosely connected with a portion 31 by an eye-member 38 which extends through opening 35 and is secured to part 33.

The normal position of the trapping mechanism, when the nest is vacant is as shown in Figures 1 and 4, and in such position the board 26 is pulled down and provides an easy step for the hen. As the hen steps on the member 13, the board, which provides a gate or closure for the entrance opening 9 is swung upwardly to the position shown in Figure 3 for the purpose of closing opening 9, thus closing the hen in the nest and preventing other hens gaining access to the nest. After the hen has laid her egg she will put her head out of the nest above board 26 and push the latter open, that is downwardly. As the board 26 opens the hen steps thereon and lowers the board to the position shown in Figure 1. The lowering of board 26 causes the member 13 to be moved to an inclined position, thus causing the egg to roll to the rear of member 13 and against the rods 25. Here the egg remains until the next hen enters the nest, at which time the member 13 is forced by the hen to a level position whereby the rods 26 are moved toward the member 13 and assume the position shown in Figure 3, thus releasing the egg and permitting it to roll into the receiving trough.

The nest can be used singly or as a part of a series of nests. When used singly the receiving trough would be substantially as shown. When used in series, the trough may be individual for each nest or may be constructed so as to create a continuous trough along the rear of the nests without partitions.

The construction as referred to not only protects the hen from disturbances by other hens while on the nest, but also provides for depositing the eggs in the collecting trough whereby the nest is freed from the eggs and the latter at all times are spotlessly clean. The reticulated member 13 which constitutes the bottom of the nest is easily cleaned and further the structural arrangement is such that it permits easy cleaning under member 13.

What I claim is:—

1. In combination, a nest structure having a suspended depressible reticulated bottom normally inclining upwardly from rear to front and depressible by a hen on entering the nest, said structure being formed at its front with a combined hen entrance and exit opening and at its rear with an egg discharge passage, a closure for said opening, a pair of spaced supporting elements for said closure, said elements hinged to said structure, extended into the latter and pivotally connected to the front of said bottom, a pair of pivoted hangers arranged within and attached to opposed walls of said structure, said hangers arranged in proximity to said passage, a carrier fixed to the rear of said bottom and pivotally suspended from said hangers, a depending V-shaped link pivotally suspended from one of the hangers and having one of its arms enlarged at the free end of the latter, a depending link pivotally suspended at one end from the other of the hangers and having its other end enlarged, spaced rods secured to said enlarged free ends to provide a guard for said passage and for depositing a laid egg clear of the nest on the depressing of said bottom by the hen, and a bar attached to the other arm of said V-shaped link and pivotally attached to one of said elements.

2. In combination, a nest structure having a suspended depressible reticulated bottom normally inclining upwardly from rear to front and depressible by a hen on entering the nest, said structure being formed at its front with a combined entrance and exit opening for the hen and at its rear with an egg discharge passage opposed by the rear of said bottom, a closure for said opening, supporting means for said closure hinged to said structure below said opening and extending into the latter, said means at its inner end being pivotally connected to the front of said bottom, hangers pivotally attached to opposed walls of said structure in proximity to said passage, a carrier fixed to the rear of said bottom and pivotally suspended from said hangers, depending links pivotally suspended from said hangers and each formed with an enlarged free end, spaced rods between and secured to said enlarged ends to provide a guard for said passage on the elevating of the bottom on the opening of the nest and for depositing a laid egg clear of the nest on the lowering of said bottom by the closing of the nest, and a coupling bar connecting one of said links to said means.

3. In combination, a nest having a suspended depressible reticulated bottom depressible by a hen on entering the nest and normally inclining upwardly from rear to front, said nest having an egg discharge passage at its rear, said passage opposing the rear of said bottom, a pair of spaced supports pivotally mounted intermediate their ends and extending into and projecting from the nest, a tread member carried by said supports exteriorly of the nest for controlling entrance and exit to and from the latter, a pair of spaced opposed hangers pivotally supported within the nest above said bottom and in proximity to said passage, a carrier pivotally suspended from said hangers and fixed to the rear of said bottom, coupling means for connecting the front of said bottom to said supports rearwardly of the pivots for the latter, a pair of links pivotally suspended from the hangers, rods arranged between and connected to said links to provide a guard for said passage on the elevating of said bottom on the opening of the nest and for depositing a laid egg clear of the nest on the depression of said bottom on the closing of the nest, and coupling means between one of said links and the rear of one of said supports.

In testimony whereof, I affix my signature hereto.

JOHN A. JOHNSTON.